US009049750B2

(12) United States Patent
Ishihara et al.

(10) Patent No.: US 9,049,750 B2
(45) Date of Patent: Jun. 2, 2015

(54) HONEYCOMB STRUCTURE BODY

(71) Applicant: DENSO CORPORATION, Kariya, Aichi-pref. (JP)

(72) Inventors: Mikio Ishihara, Anjo (JP); Tomoo Kawase, Aichi-ken (JP)

(73) Assignee: DENSO CORPORATION, Kariya (JP)

( * ) Notice: Subject to any disclaimer, the term of this patent is extended or adjusted under 35 U.S.C. 154(b) by 172 days.

(21) Appl. No.: 13/775,688

(22) Filed: Feb. 25, 2013

(65) Prior Publication Data

US 2013/0224080 A1 Aug. 29, 2013

(30) Foreign Application Priority Data

Feb. 24, 2012 (JP) ................................ 2012-038086
Oct. 17, 2012 (JP) ................................ 2012-229631

(51) Int. Cl.
*B01D 50/00* (2006.01)
*H05B 3/48* (2006.01)
*H05B 3/06* (2006.01)

(52) U.S. Cl.
CPC .. *H05B 3/48* (2013.01); *H05B 3/06* (2013.01); *H05B 2203/024* (2013.01)

(58) Field of Classification Search
CPC ....... H05B 3/48; H05B 3/06; H05B 2203/024
USPC ............................ 422/174, 177, 180; 55/523
See application file for complete search history.

(56) References Cited

U.S. PATENT DOCUMENTS

| | | | | |
|---|---|---|---|---|
| 5,177,961 | A * | 1/1993 | Whittenberger | 60/300 |
| 5,245,825 | A | 9/1993 | Ohhashi et al. | |
| 5,446,264 | A | 8/1995 | Kondo et al. | |
| 2012/0076699 | A1* | 3/2012 | Ishihara | 422/174 |

FOREIGN PATENT DOCUMENTS

| | | | |
|---|---|---|---|
| JP | 04-280086 | | 10/1992 |
| JP | 04-280087 | | 10/1992 |
| JP | 05269387 | A * | 10/1993 |
| JP | 2010-106735 | | 5/2010 |
| JP | 2010-229976 | | 10/2010 |
| JP | 2011-171140 | | 9/2011 |
| JP | 2011212577 | A * | 10/2011 |
| JP | 2013-083162 | | 5/2013 |

OTHER PUBLICATIONS

Office Action (2 pages) dated Feb. 25, 2014, issued in corresponding Japanese Application No. 2012-229631 and English translation (2 pages).

* cited by examiner

*Primary Examiner* — Tom P Duong
(74) *Attorney, Agent, or Firm* — Nixon & Vanderhye P.C.

(57) ABSTRACT

A honeycomb structure body is comprised of a honeycomb body, a pair of electrodes, a pair of electrode terminals and one or more slit sections. The honeycomb body is comprised of a cell formation section and an outer skin section. The outer skin section has a cylindrical shape and covers the cell formation section. The electrodes are formed on an outer peripheral surface of the outer skin section so that the electrodes face with to each other in a radial direction of the honeycomb structure body. Each electrode terminal is formed in an electrode terminal formation section on the corresponding electrode. One or more the slit sections are formed in at least one of an electrode terminal formation section and a circumferential outside section of the electrode terminal formation section.

9 Claims, 12 Drawing Sheets

HONEYCOMB STRUCTURE BODY

CROSS-REFERENCE TO RELATED APPLICATION

This application is related to and claims priority from Japanese Patent Applications No. 2012-38086 filed on Feb. 24, 2012, and No. 2012-229631 filed on Oct. 17, 2012, the contents of which are hereby incorporated by reference.

BACKGROUND OF THE INVENTION

1. Field of the Invention

The present invention relates to honeycomb structure bodies for use in an electric heating catalyst device capable of purifying exhaust gas emitted from an internal combustion engine mounted to motor vehicles, industrial plants, etc.

2. Description of the Related Art

In general, a catalyst device is mounted to an exhaust gas pipe of an exhaust gas purifying system mounted to a motor vehicle. For example, exhaust gas is emitted from an internal combustion engine and is passing through the exhaust gas pipe in the exhaust gas purifying system. The exhaust gas is purified by the catalyst device mounted on the exhaust gas pipe. The purified exhaust gas is then discharged to the outside of the internal combustion engine of the motor vehicle. The catalyst device uses a honeycomb structure body. The honeycomb structure body supports catalyst such as platinum (Pt), palladium (Pd), rhodium (Rh), etc. It is necessary to heat the catalyst supported in the honeycomb structure body to approximately 400° C. in order to adequately activate the catalyst. In order to increase a temperature of the honeycomb structure body in the catalyst device up to a necessary temperature and to activate the catalyst supported in the honeycomb structure body, a conventional technique provides an electric heating catalyst (EHC) device. The EHC device has a honeycomb structure body, an outer skin section and a pair of electrodes. The honeycomb structure body is equipped with a honeycomb body. The pair of the electrodes is formed on the outer circumferential surface of the honeycomb body. When electrical power is supplied to the electrodes, current flows in the honeycomb body, and heat energy is generated and the catalyst is heated to an optimum temperature to activate the catalyst. For example, a prior patent document, Japanese patent laid open publication No. JP H04-280086, discloses a honeycomb structure body having a conventional structure in which a pair of electrodes is formed on an outer surface of a honeycomb body, and an electrode terminal is formed on the corresponding electrode.

However, the honeycomb structure body disclosed in Japanese patent laid open publication No. JP H04-280086 has a drawback to easily transmit heat energy of exhaust gas passing through the inside of the honeycomb body to the electrode terminals because the electrode terminals have a large heat capacity. This decreases a temperature of the electrodes directly under the electrode terminals and the sections near to the electrode terminals. As a result, a temperature difference occurs along an axial direction (or a longitudinal direction) of the honeycomb body through which exhaust gas is passing. In general, when the honeycomb structure body is frequently used in a cooling/heating cycle, thermal stress is easily caused by the temperature difference in the section of the honeycomb body directly under the electrode terminals and the sections of the honeycomb body close to the electrodes. As a result, cracks are generated in the electrodes and the inside of the honeycomb body by the thermal stress.

SUMMARY

It is therefore desired to provide a honeycomb structure body for use in electric heating catalyst devices, having a structure capable of preventing cracks from being generated in electrodes, peripheral sections of the electrodes and the honeycomb structure body.

An exemplary embodiment provides a honeycomb structure body having a honeycomb body as a catalyst carrier body, a pair of electrodes, a pair of electrode terminals and one or more slit sections. The honeycomb body has a cell formation section and an outer skin section. The outer skin section has a cylindrical shape and covers the cell formation section. The electrodes are formed on an outer peripheral surface of the outer skin section so that the electrodes face with to each other in a radial direction of the honeycomb body. Each of the electrode terminals is formed in an electrode terminal formation section on the corresponding electrode. In particular, one or more slit sections are formed in at least one of the electrode terminal formation section and a circumferential outside section of the electrode terminal formation section. In the structure of the honeycomb structure body according to the exemplary embodiment of the present invention, the slit section is formed at least in the electrode terminal formation section on the corresponding electrode.

In general, heat energy of exhaust gas passing through the honeycomb body is easily transmitted to the electrode terminals in the honeycomb structure body. As a result, a temperature difference is generated in the honeycomb body. The thermal stress is caused by the temperature difference when the honeycomb structure body is frequently used in a cooling/heating cycle. In particular, the slit section is formed in at least one of the electrode terminal formation section of the electrode terminal formed on the corresponding electrode and the circumferential outside section of the electrode terminal formation section. The above structure of the honeycomb structure body having the slit section makes it possible to decrease generation of thermal stress with high efficiency, and to prevent cracks from being generated in the electrodes and the honeycomb body.

The present invention provides the honeycomb structure body having the above structure capable of suppressing cracks from being generated in the electrodes and the honeycomb body.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
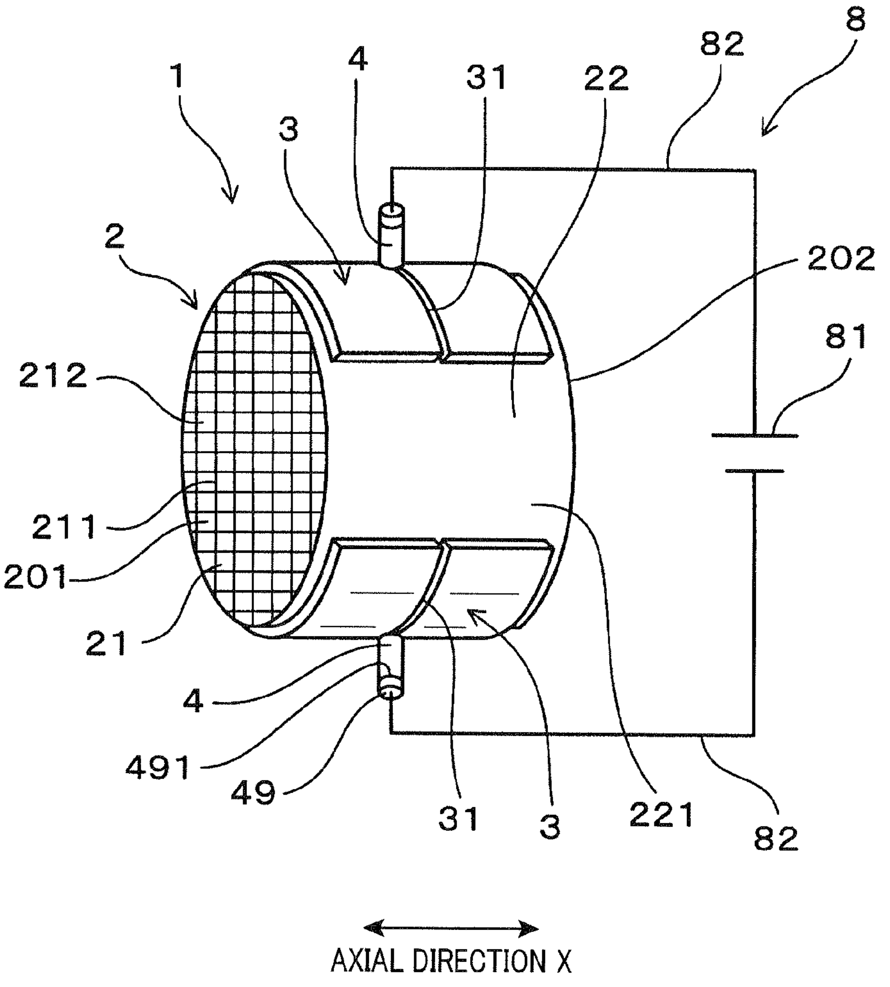
FIG. 1 is a perspective view showing a structure of a honeycomb structure body according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

The honeycomb structure body according to the present invention has a structure in which the cell formation section is comprised of a plurality of porous partition walls and a plurality of cells. The porous partition walls are arranged in a lattice shape. Each of the cells is surrounded by the porous partition walls, for example, four partition walls to make a rectangle cell having a rectangle shape or six partition walls to make a hexagonal cell having a hexagonal shape. The cells are formed along an axial direction of the honeycomb body.

As will be explained later, the honeycomb structure body is used as an electric heating catalyst (EHC) device. In this case, the partition walls of the honeycomb body support three-way catalyst thereon. For example, the three-way catalyst is comprised of platinum (Pt), palladium (Pd), rhodium (Rh), etc.

In the structure of the honeycomb structure body according to the present invention, the electrodes and the electrode terminals are made of materials such as SiC, SiC—Si ceramics, etc. The SiC—Si ceramics have a structure in which Si is impregnated in SiC. Further, it is possible to use metal such as Cr, Fe, Ni, Mo, Mn, Si, Ti, Nb, Al, etc. or alloy thereof as the materials forming the electrodes and the electrode terminals. It is also possible to use a mixture material made of ceramics such as SiC, etc., and the metal or the alloy previously described.

It is possible for the electrode terminals to have various shapes such as a hollow pillar shape, a column shape, or a hollow cylinder shape, etc., for example.

In the structure of the honeycomb structure body according to the present invention, the slit section is formed on at least an electrode terminal formation section on the corresponding electrode. The electrode terminal formation section indicates a position and a part on which the electrode terminal for the corresponding electrode is formed.

It is possible that the slit section is formed on various sections, for example, the section directly under the electrode terminal and the section near to the corresponding electrode. It is also possible to change the number of the slit sections as long as the electrodes are somehow electrically connected to the corresponding electrode terminals, respectively, and current flows through the electrodes.

It is possible for the slit section to have a structure in which the slit section penetrates through the corresponding electrode in a thickness direction of the electrode. It is also possible that the slit section is a depressed section (or a concave section) formed on a surface of the corresponding electrode in a thickness direction of the electrode. In this case, the sit section does not penetrate the corresponding electrode.

It is possible for the honeycomb structure body according to the present invention to have a structure in which the slit section is formed in the electrode terminal formation section on which the electrode terminal for the corresponding electrode is formed. This structure makes it possible to decrease damage caused by thermal stress, for example, generated in the section directly under the electrode terminal because the slit section is formed directly under the electrode terminal in the electrode terminal formation section where a maximum amount of thermal stress is generated.

It is possible for the honeycomb structure body according to the present invention to have a structure in which the slit section is formed in the corresponding electrode along a circumferential direction of the honeycomb body. This structure makes it possible to decrease damage caused by thermal stress with high efficiency because the slit section is formed along a direction (a circumferential direction of the honeycomb body) which cuts the flowing direction (an axial direction of the honeycomb body) of exhaust gas along which a temperature difference is generated in the electrodes and the honeycomb body.

It is possible for the honeycomb structure body according to the present invention to have a structure in which the slit section is formed so that the slit section crosses the corresponding electrode in a circumferential direction of the honeycomb body.

This structure makes it possible to further decrease damage caused by thermal stress generated in the electrodes, etc. because the slit section is extended at both ends of the electrode in a circumferential direction of the honeycomb body. The structure in which the slit section crosses the corresponding electrode indicates a structure in which the slit section divides the corresponding electrode into a plurality of electrode sub-sections.

It is possible for the honeycomb structure body according to the present invention to have a structure in which the slit section is formed to cross the electrode in a circumferential direction of the honeycomb body so that the slit section divides the corresponding electrode into two electrode sub-sections, and the electrode has an axial length of not less than 50 mm, a bending strength $\sigma$ within a range of 5 to 130 MPa, a thermal expansion coefficient $\alpha$ within a range of 4 to $6.5\times10^{-6}$/° C., a Young's modulus E within a range of 10 to 300 GPa, and a thermal shock fracture resistance parameter R of not less than 130° C. The thermal shock fracture resistance parameter R is expressed by a formula: $R=\sigma/(\alpha\times E)$.

This structure makes it possible to further suppress cracks from being generated in the electrodes. That is, when the electrode is divided into a plurality of electrode sub-sections by the corresponding slit section, a difference in temperature between one end of the divided part and the other end of the divided part in an axial direction is greatly decreased than a difference in temperature between one end and the other end of the electrode when the electrode is not divided. This structure makes it possible to decrease the amount of thermal stress generated in the electrode, and to suppress cracks from being generated in the divided electrode sub-sections.

The structure having the thermal shock fracture resistance parameter R of not less than a predetermined value makes it possible to further promote the effects obtained by the presence of the slit section. That is, when the electrode has an axial length of not less than 50 mm, because a difference in temperature between one end and the other end of the electrode in an axial direction becomes large, it is necessary to suppress cracks from being generated in the electrode. The structure in which the slit section divides the electrode into a plurality of electrode sub-sections makes it possible to suppress cracks from being generated, with high efficiency.

Further, when the thermal shock fracture resistance parameter R of the electrode is not less than 130° C., it is possible for the thermal shock fracture resistance parameter R of not less than 130° C. to easily and adequately exceed a temperature difference between one end and the other end of the divided electrode sub-section. This makes it possible to promote the effect which can suppress cracks from being generated in the divided electrode sub-sections. By the way, an axial length of the electrode indicates a distance between one end and the other end of the electrode in an axial direction of the honeycomb body.

It is preferable for the honeycomb structure body to have a structure in which the axial length of the electrode is shorter than the axial length of the honeycomb body. For example, it is preferable to have a structure in which the axial length of the electrode is shorter than the axial length of the honeycomb body within a range of 5 to 20 mm. Still further, it is preferable to arrange an insulator in the sections where no electrode is formed. This makes it possible to avoid occurrence of an electric short circuit between the electrode, particulate matter PM and water contained in exhaust gas.

Still further, it is preferable that the thermal shock fracture resistance parameter R of the electrode exceeds a temperature difference (as a maximum temperature difference, which will be explained later) between one end and the other end in an axial direction of the divided electrode sub-sections. This makes it possible to thoroughly avoid cracks from being generated in the electrode.

It is preferable that the formation section (in an axial direction) of the slit section formed in the corresponding electrode is determined so that a largest temperature difference (as the maximum temperature difference) becomes a minimum value, where the temperature difference is detected between one end and the other end in the divided electrode sub-sections of the electrode. This makes it possible to further decrease the magnitude of thermal stress generated in the electrode, and to further suppress cracks from being generated in the electrode.

It is possible for the honeycomb structure body according to the present invention to have a structure in which the electrode is comprised of a plurality of electrode sub-sections arranged in a circumferential direction of the honeycomb body, and to have a relationship of S1>S2, where S1 indicates a strength of the electrode sub-section on which the electrode terminal is formed, and S2 indicates a strength of the electrode sub-section on which no electrode terminal is formed. When the electrode section on which the corresponding electrode terminal is formed has a strength which is greater than the strength of the electrode section on which no electrode terminal is formed, it is possible to increase durability of the electrode against thermal stress because large thermal stress is generated in the electrode section on which the corresponding electrode terminal is formed. The strength of the electrode section indicates a strength detected by a four-point bending test which is usually used as a ceramic strength test because electrodes are in general formed by ceramics.

It is possible for the honeycomb structure body according to the present invention to have a structure in which the honeycomb structure body is accommodated in a casing. The casing is comprised of a cylindrical covering section and a terminal covering section. The terminal covering section projects from the cylindrical covering section to outside. The electrode terminals are covered with the terminal covering section. A supporting member is arranged between the cylindrical covering section, the electrodes and the honeycomb body. The electrode terminals are covered with the supporting member at the inside of the cylindrical covering section. This structure makes it possible to keep the overall surface of the electrode warm. This decreases a temperature difference generated in the section which is directly under the electrode terminal and in the honeycomb body. As a result, this makes it possible to decrease occurrence of thermal stress from being generated. For example, such a supporting member is made of alumina fiber, silica fiber or a mixture of them.

It is possible for the honeycomb structure body according to the present invention to have a structure in which the electrode terminal is made of ceramics, and a metal terminal is connected to the electrode terminal, and a junction between the electrode terminal and the metal terminal is arranged at an outside of the cylindrical covering section, and an axial length of the terminal covering section is not less than a half of an axial length of the electrode. Because a junction or a connection node between the electrode terminal and the metal terminal is directly exposed to exhaust gas having a high temperature, it is required for the connection node to have a heat resistance function. In order to prevent a resistance value of the connection node between the electrode terminal and the metal terminal from being changed by oxidation of exhaust gas, it is required for the connection node to have an oxidation resistance function. In order to satisfy the above requirements, the electrode terminal made of ceramics is formed on the section (at a high temperature side) close to the corresponding electrode, and the metal terminal is formed in the position (at a low temperature side) far from the electrode having a low electric resistance because ceramics have a superior heat resistance function and a superior oxidation resistance function.

Still further, the connection node between the electrode terminal and the metal terminal is arranged at an outside of the cylindrical covering section at a low temperature side. This arrangement makes it possible to maintain the heat resistance function and the oxidation resistance function of the connection node between the electrode terminal and the metal terminal. Further, this makes it possible to flow a stable current through the pair of the electrodes.

By the way, it is possible for the electrode terminal in the honeycomb structure body to have a length of not less than 20 mm, namely, to have a distance of not less than 20 mm between the surface of the electrode to the connection node between the electrode terminal and the metal terminal.

It is possible to decrease a temperature of the connection node between the electrode terminal and the metal terminal because the connection node is arranged at the outside of the cylindrical covering section. However, there is a possibility of increasing a temperature difference in the electrode because the electrode terminal has a large heat capacity and thermal energy is easily discharged through the electrode terminal to the outside of the honeycomb body. In order to avoid such a drawback, the terminal covering section has an axial length which is not less than a half of the axial length of the electrode. This expands an air-layer section in the inside of the terminal covering section and makes it possible to keep the surface of the electrode warm. This decreases a temperature difference generated in the electrode directly under the electrode terminal, and a temperature difference generated in the honeycomb body. As a result, this structure makes it possible to decrease thermal stress generated in the electrode and the honeycomb body.

Still further, because the axial length of the terminal covering section is equal or not less than the axial length of the electrode, it is possible to certainly obtain the effects previously described. On the other hand, when the axial length of the terminal covering section is less than a half of the axial length of the electrode, there is a difficulty for the honeycomb structure body to have these effects.

It is possible that the honeycomb structure body according to the present invention is used in an electric heating catalyst (EHC) device. The EHC device is capable of heating catalyst supported by the honeycomb body when electric power is supplied to the electrodes. This makes it possible to provide the EHC device capable of suppressing cracks from being generated in the electrodes of the honeycomb body and the honeycomb body.

First Exemplary Embodiment

A description will be given of a honeycomb structure body 1 according to a first exemplary embodiment of the present invention with reference to FIG. 1 to FIG. 7.

FIG. 1 is a perspective view showing a structure of the honeycomb structure body 1 according to the first exemplary embodiment of the present invention. As shown in FIG. 1 to FIG. 4, the honeycomb structure body 1 is comprised of a honeycomb body 2, a pair of electrodes 3 and a pair of electrode terminals 4. The honeycomb body 2 is comprised of a cell formation section 21 and a cylindrical outer skin section 22. The cell formation section 21 is surrounded by the cylindrical outer skin section 22. The electrodes 3 are formed to face in radial direction of the honeycomb body 2 with each other on an outer peripheral surface of the cylindrical outer skin section 22 of the honeycomb body 2. The electrode terminals are formed on the electrodes 3, respectively. A slit section 31 is formed in at least one of an electrode terminal formation section and an outer section of the electrode terminal formation section, where the electrode terminal 4 is formed in the electrode terminal formation section.

A description will now be given of the structure of the honeycomb structure body 1 according to the first exemplary embodiment.

As shown in FIG. 1, the honeycomb structure body 1 according to the first exemplary embodiment has the honeycomb body 2, the pair of the electrodes 3 and the pair of the electrode terminals 4.

The honeycomb body 2 is comprised of the cell formation section 21 and the cylindrical outer skin section 22. The cell formation section 21 is surrounded by the cylindrical outer skin section 22. The honeycomb body 2 has a cylindrical shape. The honeycomb body 2 is made of porous ceramics and the porous ceramics are made of SiC.

Figure 2:
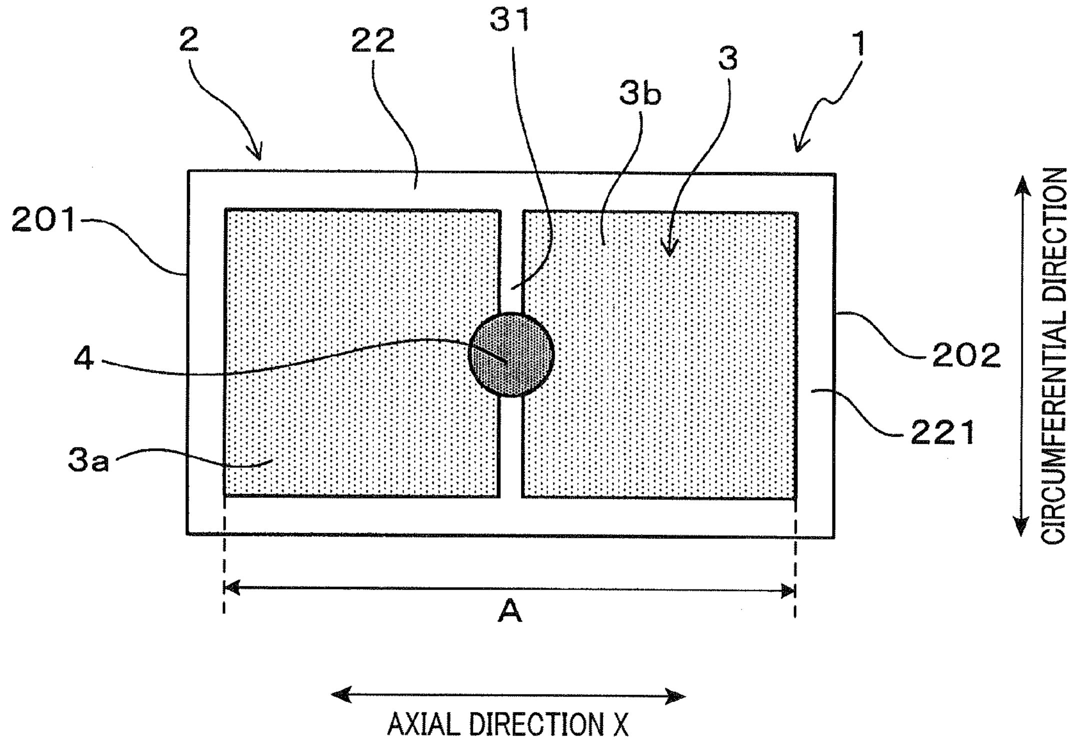
FIG. 2 is a plan view showing the structure of the slit section, the electrode terminal and the electrode in the honeycomb structure body shown in FIG. 1.

As shown in FIG. 1 and FIG. 2, the cell formation section 21 in the honeycomb body 2 is comprised of porous partition walls 211 and a plurality of cells 212. Each of the cells 212 is surrounded by the porous partition walls 211. The cells 212 are formed in an axial direction X of the honeycomb body 2. Exhaust gas is introduced into the inside of the honeycomb body 2 through end sections 201 of the honeycomb body 2. After passing through the inside of the honeycomb body 2, the exhaust gas is discharged to the outside through the other end section 202 of the honeycomb body 2.

Catalyst (not shown) is supported on the surface of the porous partition walls 211. The catalyst is capable of purifying exhaust gas. It is possible for the honeycomb body 2 to use noble metal such as Pt, Pd, Rh, etc., as the catalyst.

The pair of the electrodes 3 is formed on the outer peripheral surface 221 of the cylindrical outer skin section 22 in the honeycomb body 2. The electrodes 3 are arranged to face to each other in a radial direction of the honeycomb body 2. The electrodes 3 are made of conductive ceramics. The conductive ceramics is made of a composite material of SiC—Si. The electrodes 3 have a plate shape having a uniform thickness along the outer peripheral surface 221 of the cylindrical outer skin section 22 in a circumferential direction of the honeycomb body 2. The electrode 3 has a thickness of 1 mm.

The electrode 3 is fixed onto the outer peripheral surface 221 of the cylindrical outer skin section 22 of the honeycomb body 2 by a conductive adhesive agent (or a conductive bonding agent). The adhesive agent contains carbon, binder, SiC—Si composite material which forms the electrode 3, etc. The electrode terminal 4 is formed on each electrode 3. The electrode terminal 4 is made of conductive ceramics made of SiC—Si composite material, similar to the electrode 3. The electrode terminal 4 is fixed to the surface of the corresponding electrode 3 by the adhesive agent.

FIG. 2 is a plan view showing the structure of the slit section 31, the electrode terminal 4 and the electrode 3 in the honeycomb structure body 1 according to the first exemplary embodiment shown in FIG. 1. As shown in FIG. 2, the slit section 31 is formed in each of the electrodes 3. The slit section 31 is formed in the electrode terminal formation section and a circumferentially outer peripheral section of the electrode terminal formation section so that the slit section 31 is directly formed in the electrode terminal formation section of the electrode terminal 4. As shown in FIG. 1 and FIG. 2, the slit section 31 is formed in the electrode 3 so that the slit section penetrates in a thickness direction of the electrode 3, and the slit section 31 crosses the electrode 3 along a circumferential direction of the honeycomb body 2. That is, the slit section 31 divides the electrode 3 in an axial direction X into two electrode sub-sections 3*a* and 3*b* so that both circumferential ends of the slit section 31 are opened.

As shown in FIG. 2, the electrode 3 has an axial length A of not less than 50 mm. The axial length A of the electrode 3 is a distance in the axial direction X from one end to the other end of the electrode 3. The honeycomb structure body 1 according to the first exemplary embodiment has the electrodes 3 having an axial length A of 80 mm. The honeycomb body 2 has an axial length of 100 mm. The electrode 3 is not formed in the section within a range of one end surface 201 of the honeycomb body 2 to an axially inside length of 10 mm. Further, the electrode 3 is also not formed in the section within a range of the other end surface 202 of the honeycomb body 2 to an axially inside length of 10 mm. Still further, the electrode terminal 4 is formed at an axially central section of the honeycomb body 2 which is an inside length of 50 mm in the axial direction X from the end surface 201 (202).

Still further, the electrode 3 has a bending strength $\sigma$ within a range of 5 to 130 MPa, a thermal expansion coefficient $\alpha$ within a range of 4 to $6.5\times10^{-6}$/° C., a Young's modulus E within a range of 10 to 300 GPa, and a thermal shock fracture resistance parameter R of not less than 130° C. The thermal shock fracture resistance parameter R is expressed by a formula: $R=\sigma/(\alpha\times E)$.

Figure 3:
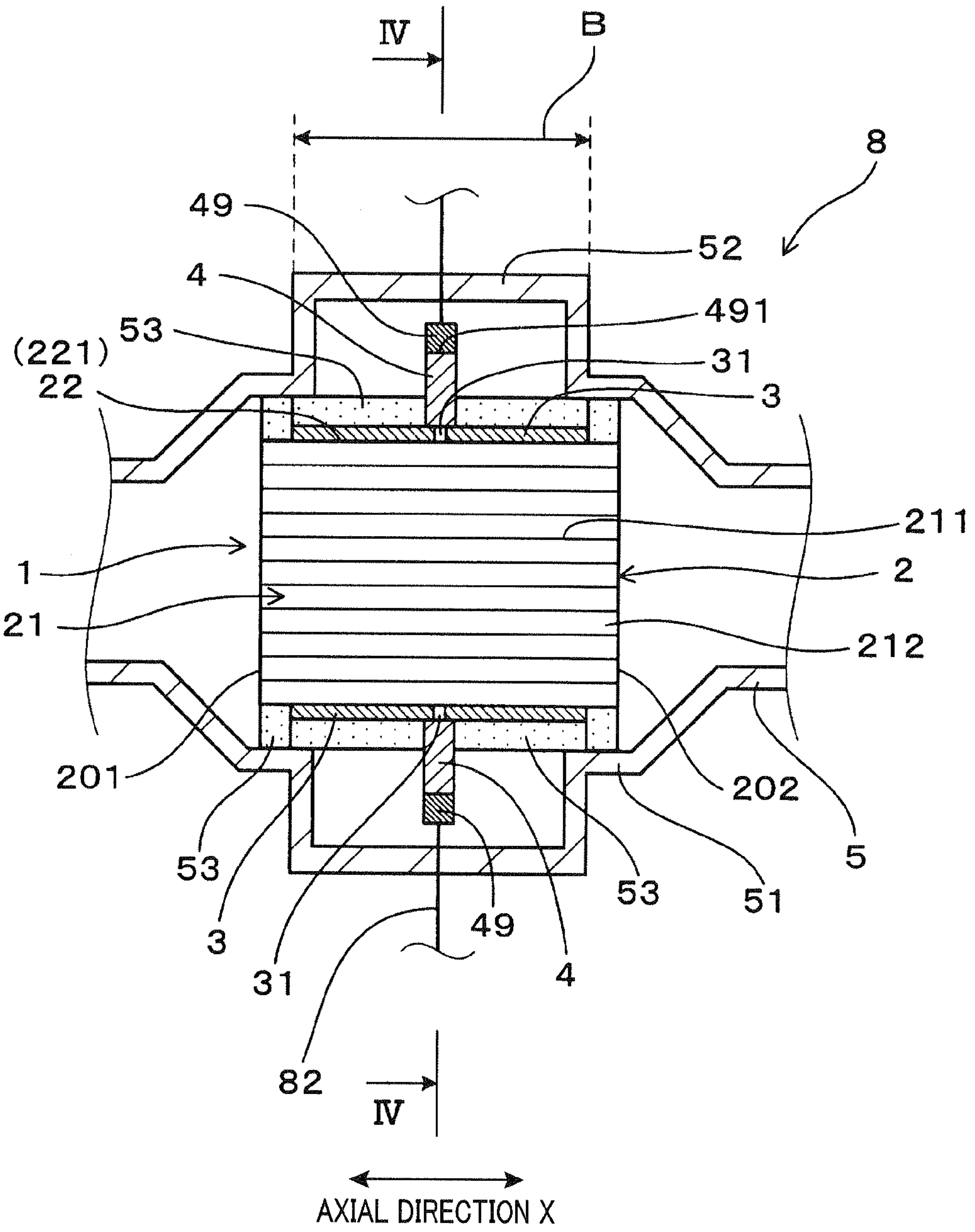
FIG. 3 is a view showing a cross section of the honeycomb structure body fitted into a casing according to the first exemplary embodiment of the present invention shown in FIG. 1.
Figure 4:
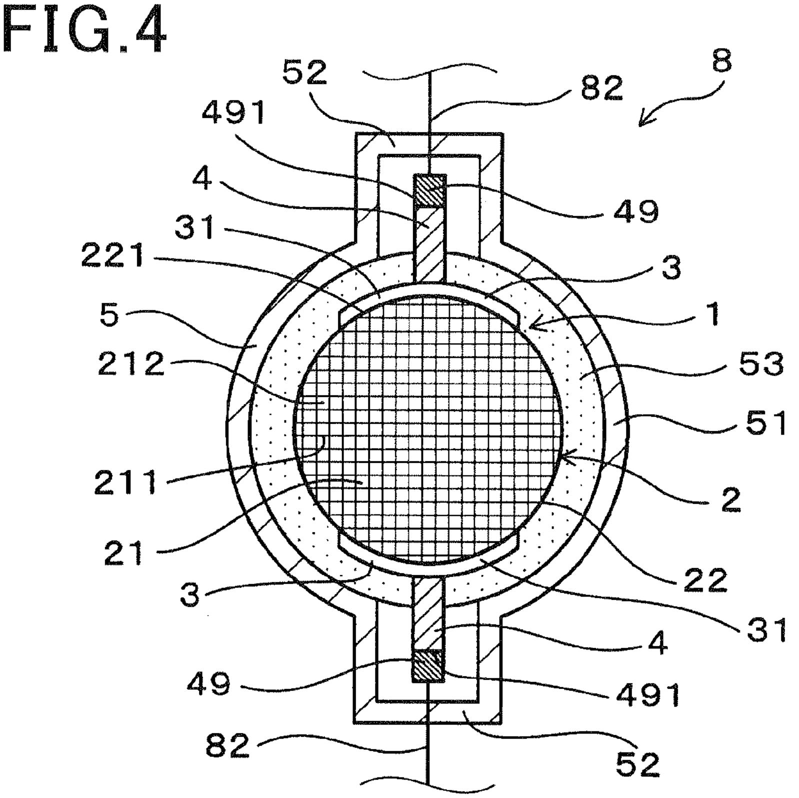
FIG. 4 is a view showing the honeycomb structure body along the line IV shown in FIG. 3.

FIG. 3 is a view showing a cross section of the honeycomb structure body 1 fitted in a casing 5 according to the first exemplary embodiment shown in FIG. 1. FIG. 4 is a view showing the honeycomb structure body 1 along the line IV shown in FIG. 3;

As shown in FIG. 3 and FIG. 4, the honeycomb structure body 1 is accommodated in the casing 5. The casing 5 has a cylindrical covering section 51 and a terminal covering section 52. The terminal covering section 52 projects from the cylindrical covering section 51 to outside. The electrode terminals 4 are covered with the terminal covering section 52. The terminal covering section 52 has an axial length B (see FIG. 3) of not less than a half of the axial length A (see FIG. 2) of the electrode 3. The honeycomb structure body 1 according to the first exemplary embodiment has a structure in which the axial length B of the terminal covering section 52 is equal to the axial length A of the electrode 3 (A=B).

A metal terminal 49 is connected to the corresponding electrode terminal 4 which is covered with the terminal covering section 52. A junction or a connection node 491 between the electrode terminal 4 and the metal terminal 49 is arranged at an outside of the cylindrical covering section 51. A length of the electrode terminal 4, namely a distance between the surface of the electrode 3 to the connection node 491 between the electrode terminal 4 and the metal terminal 49 is 20 mm.

A supporting member 53 is arranged between the cylindrical covering section 51, the honeycomb body 2 and the electrodes 3. That is, the honeycomb structure body 1 is accommodated in the casing 5 through the supporting member 53. The outer periphery of the electrode terminals 4 is surrounded at the inside of the cylindrical covering section 51 by the supporting member 53. Further, supporting member 53 is a mat made of alumina fibers.

As shown in FIG. 1, the metal terminal 49 connected to the corresponding electrode terminal 4 is connected to a power source 81 through lead wires 82.

The honeycomb structure body 1 according to the first exemplary embodiment is used in an electrically heating catalyst (EHC) device 8. When electric power is supplied to the pair of the electrodes 3, the catalyst supported by the honeycomb body 2 is heated by the EHC 8.

A description will now be given of a method of producing the honeycomb structure body 1 according to the first exemplary embodiment.

In the method, the honeycomb body 2 is produced by using a known production method, which is made of porous ceramics such as SiC. Next, electrode material having a sheet shape is molded in order to make the pair of the electrodes 3. Electrode terminal material having a column shape is molded in order to make the pair of the electrode terminals 4. Specifically, the electrode material and the electrode terminal material are made of composite material Si—SiC which is fired.

Next, the pair of the electrodes 3 is arranged and adhered on the outer circumferential surface of the honeycomb body 2 by using adhesive paste which contains Si—SiC composite material, carbon, binder, etc. Then, the electrode terminal material is arranged on the surface of the electrode material. The honeycomb molded body as the honeycomb body 2 on which the electrode material (as the pair of the electrodes 3) and the electrode terminal material (as the pair of the electrode terminals 4) are arranged is heated and fired at a predetermined temperature (approximately 1600° C.) in a predetermined atmosphere (containing Ar, at an ordinary pressure). The above method makes it possible to produce the honeycomb structure body 1 comprised of the honeycomb body 2 on which the pair of the electrode 3 and the pair of the electrode terminals 4 are formed.

A description will now be given of the action and effects of the honeycomb structure body 1 according to the first exemplary embodiment of the present invention.

In the structure of the honeycomb structure body 1, the slit section 31 is formed in at least the electrode terminal formation section of the electrode terminal 4 for the corresponding electrode 3. That is, under a structure in which thermal energy generated in the honeycomb body 2 is easily transmitted to the electrode terminal 4 side, thermal stress is generated in the section which is directly under the electrode terminal 4, the electrode 3 near to the section directly under the electrode terminal 4, and also generated in the honeycomb body 2 when the honeycomb structure body 1 is frequently used in a cooling/heating cycle. In order to avoid the concentration of heat energy in the above sections, the honeycomb structure body 1 according to the first exemplary embodiment of the present invention is comprised of one or more slit sections 41. The slit section 41 is formed in at least one of the electrode terminal formation section in which the electrode terminal 4 is formed and a circumferential outside section of the electrode terminal formation section. The structure of the slit section 41 makes it possible to suppress the influence of generated thermal energy by the presence of the slit section 41, and to avoid cracks from being generated in the electrodes 3 and the honeycomb body 2.

The slit section 31 is formed in the electrode terminal formation section in which the electrode terminal 4 for the corresponding electrode 3 is formed. That is, forming the slit section 31 in the section directly under the electrode terminal 4, where thermal stress is mostly generated, makes it possible to further decrease damages caused by generated thermal stress.

The slit section 31 is formed in the electrode 3 along a circumferential direction of the honeycomb body 2. That is, this structure makes it possible to decrease generated thermal stress with high efficiency because the slit section 31 is formed to cross the electrode 3 in a circumferential direction of the honeycomb body 2 which divides the direction of exhaust gas flow along which a temperature difference is generated in the electrode 3 and the honeycomb body 2.

Further, the slit section 31 is formed to cross the corresponding electrode 3 in a circumferential direction of the honeycomb body 2. That is, the shape of the slit section 31, both ends of which are opened in a circumferential direction, makes it possible to further decrease damage caused by generated thermal stress.

Still further, the slit section 31 divides the electrode 3 in a circumferential direction into the two electrode sub-sections, as shown in FIG. 2. The electrode 3 has an axial length A of not less than 50 mm. Further, the electrode 3 has a bending strength σ within a range of 5 to 130 MPa, a thermal expansion coefficient α within a range of 4 to $6.5\times10^{-6}$/° C., a Young's modulus E within a range of 10 to 300 GPa, and a thermal shock fracture resistance parameter R of not less than 130° C. The thermal shock fracture resistance parameter R is expressed by a formula: $R=\sigma/(\alpha\times E)$. This structure of the electrodes 3 makes it possible to further suppress cracks from being generated in the electrodes 3. That is, when the electrode 3 is divided into the electrode sub-sections 3*a*, 3*b* by the corresponding slit section 31, a temperature difference between one end of the electrode sub-section 3*a*, 3*b* (as the divided part), and the other end of the electrode sub-section 3*a*, 3*b* in an axial direction X is greatly decreased compared to a temperature difference between one end and the other end of the electrode when the electrode is not divided by the slit section. This structure makes it possible to decrease a magnitude of thermal stress and damages caused by the thermal stress generated in the electrode, and to suppress cracks from being generated in the divided electrode parts.

The structure of the electrode 3 having the thermal shock fracture resistance parameter R of not less than a predetermined value makes it possible to further promote the effects obtained by the presence of the slit section 31. That is, when the electrode 3 has an axial length of not less than 50 mm, because a temperature difference between one end and the other end of the electrode 3 (or the electrode sub-section) in an axial direction X becomes large, it is necessary to suppress cracks from being generated in the electrode 3. Dividing the electrode 3 into a plurality of electrode sub-sections by the slit section 31 makes it possible to suppress cracks from being generated with high efficiency.

Further, when the thermal shock fracture resistance parameter R of the electrode 3 is not less than 130° C., it is possible for the thermal shock fracture resistance parameter R of not less than 130° C. to easily and adequately exceed a temperature difference between one end and the other end of the electrode sub-section 3*a*, 3*b* in the electrode 3. This makes it possible to promote the effects to suppress cracks from being generated in the electrode sub-section 3*a*, 3*b* of the electrode 3.

In addition, the honeycomb structure body 1 is accommodated in the casing 5. The casing 5 is comprised of the cylindrical covering section 51 and the terminal covering section 52. The terminal covering section 52 projects from the cylindrical covering section 51 to outside. The electrode terminals 4 are covered with the terminal covering section 52. The supporting member 53 is arranged between the cylindrical covering section 51, the electrodes 3 and the honeycomb body 2. The electrode terminals 4 are covered with the supporting member 3 at the inside of the cylindrical covering section 51. This structure makes it possible to keep the overall surface of the electrode 3 warm. This decreases a temperature difference generated in the section which is directly under the electrode terminal 4 and in the honeycomb body 2. As a result, this makes it possible to decrease occurrence of thermal stress from being generated in the electrodes 3, the electrode terminals 4 and the honeycomb body 2.

Still further, the electrode terminal 4 is made of ceramics, and the corresponding metal terminal 49 is connected to the electrode terminal 4, and a junction between the electrode terminal 4 and the metal terminal 49 is arranged at an outside of the cylindrical covering section 51. The axial length B of the terminal covering section 52 is not less than a half of the axial length A of the electrode 3.

Because the junction or the connection node 491 between the electrode terminal 4 and the metal terminal 49 is directly exposed to exhaust gas having a high temperature emitted from an internal combustion engine (not shown), it is required for the connection node 491 to have a heat resistance function. In order to prevent a resistance change by oxidation, it is further required for the connection node 491 to have an oxidation resistance function. In order to achieve, namely, solve these requirements, the electrode terminal 4 made of ceramics is formed to at a position (at a high temperature side) close to the electrode 3, and the metal terminal 49 is formed at a position (at a low temperature side) far from the electrode 3 having a low electric resistance because ceramics have a superior heat resistance function and a superior oxidation resistance function. Still further, the connection node 491 between the electrode terminal 4 and the metal terminal 49 is formed at an outside of the cylindrical covering section 51 at a low temperature side. This arrangement makes it possible to maintain the heat resistance function and the oxidation resistance function of the connection node 491 between the electrode terminal 4 and the metal terminal 49. Further, this makes it possible to flow a stable current through the pair of the electrodes 3.

To expand an air layer section in the terminal covering section 52 makes it possible to keep the surface of the electrode 3 warm. This decreases a temperature difference between the electrode 3 directly under the electrode terminal 4 and the honeycomb body 2. As a result, this structure makes it possible to decrease thermal stress from being generated in the electrode 3 and the honeycomb body 2.

The honeycomb structure body according to the first exemplary embodiment is used in an electric heating catalyst (EHC) device 8 capable of heating catalyst supported by the honeycomb body 2 when electric power is supplied to the electrodes 3. This makes it possible to provide the EHC device 8 capable of suppressing cracks from being generated in the electrodes 3 directly under the electrode terminal 4 and in the honeycomb body 2.

The first exemplary embodiment provides the honeycomb structure body 1 having the structure previously described capable of suppressing cracks from being generated in the electrodes 3 and the honeycomb body 2.

Figure 5:
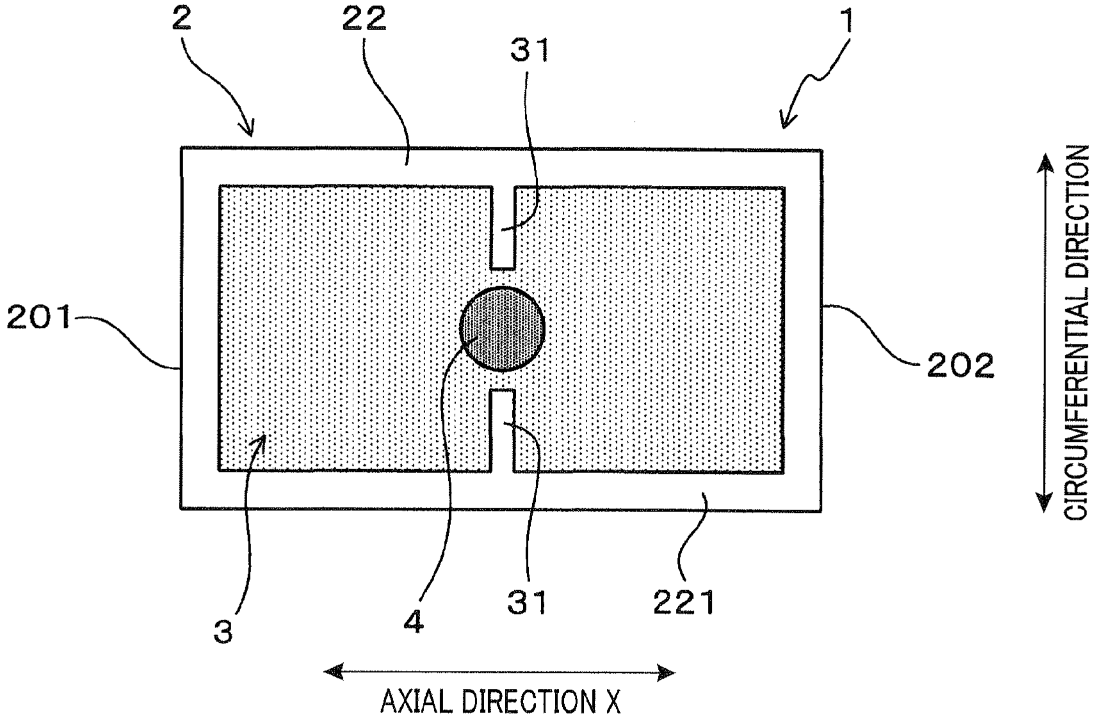
FIG. 5 is a plan view showing another structure of the slit section, the electrode terminal and the electrode in the honeycomb structure body according to the first exemplary embodiment of the present invention.

FIG. 5 is a plan view showing another structure of the slit section, the electrode terminal and the electrode in the honeycomb structure body 1 according to the first exemplary embodiment of the present invention.

In the structure of the honeycomb body 2 shown in FIG. 2, the slit section 31 is formed in the electrode terminal formation section and the circumferential outer section of the electrode terminal formation section in a circumferential direction. However, the concept of the present invention is not limited by this structure. For example, as shown in FIG. 5, it is possible to form the slit section 31 in a circumferential outer section only in the electrode terminal formation section in a circumferential direction.

Further, it is possible to form the slit section 31 in the electrode terminal formation section only in the electrode 3.

As shown in FIG. 1 to FIG. 3, the slit section 31 is formed in the corresponding electrode 3 in one-to-one correspondence. However, the concept of the present invention is not limited by this structure. For example, it is possible for the electrode 3 to have a plurality of slit sections. Still further, it is possible to form the slit section 31 in a section which is different from the electrode terminal formation section and the outer section in a circumferential direction of the electrode terminal formation section.

Figure 6:
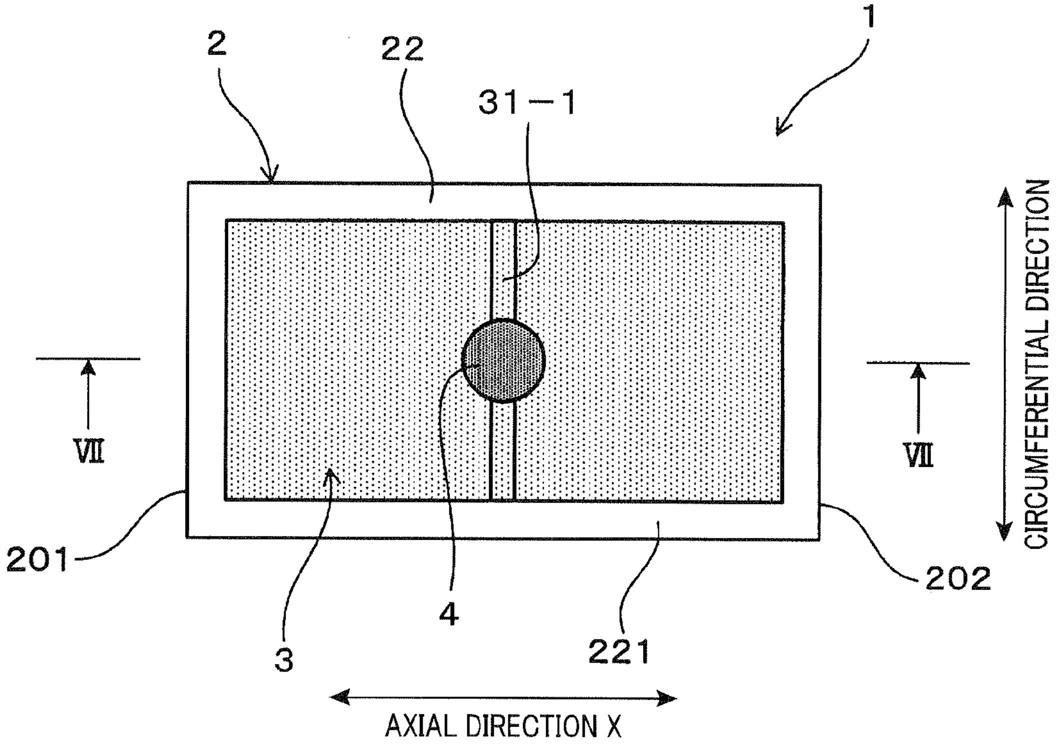
FIG. 6 is a plan view showing another structure of the slit section, the electrode terminal and the electrode in the honeycomb structure body according to the first exemplary embodiment of the present invention.
Figure 7:
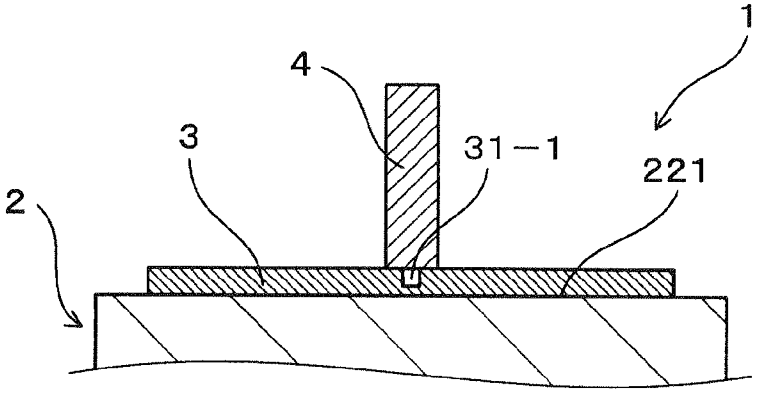
FIG. 7 is a view showing the structure of the slit section, the electrode terminal and the electrode in the honeycomb structure body along the line VII shown in FIG. 6.

FIG. 6 is a plan view showing another structure of the slit section, the electrode terminal and the electrode in the honeycomb structure body 1 according to the first exemplary embodiment of the present invention. FIG. 7 is a view showing the structure of the slit section, the electrode terminal and the electrode in the honeycomb structure body 1 along the line VII shown in FIG. 6.

As shown in FIG. 2 and FIG. 3, the slit section 31 is formed to penetrate the electrode 3 in a thickness direction of the electrode 3. However, the concept of the present invention is not limited by this structure. For example, as shown in FIG. 6 and FIG. 7, it is possible to form the slit section 31-1 as a groove formed in a surface of the electrode 3 along a circumferential direction of the honeycomb body 2. That is, as shown in FIG. 6 and FIG. 7, the slit section 31-1 does not penetrate in the electrode 3. In other words, the slit section 31-1 is a groove formed in a surface of the electrode 3 to have a depressed shape or a concave shape along a circumferential direction of the honeycomb body 2.

Second Exemplary Embodiment

A description will be given of the honeycomb structure body according to a second exemplary embodiment of the present invention with reference to FIG. 8 and FIG. 9.

Figure 8:
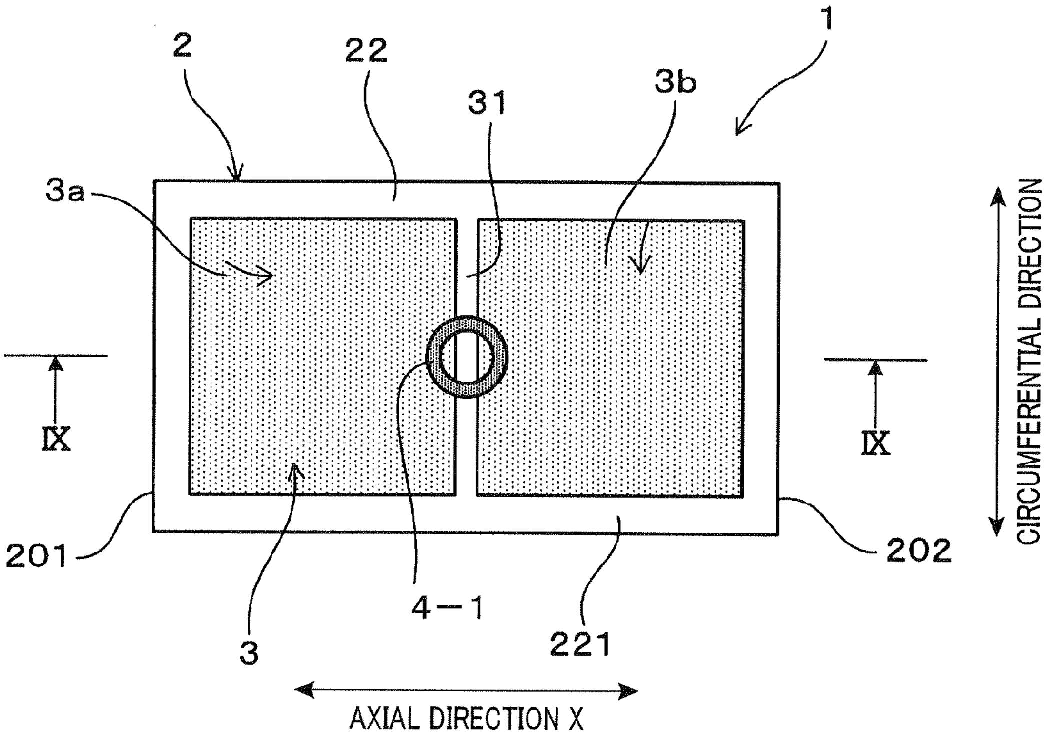
FIG. 8 is a plan view showing a structure of the slit section, the electrode terminal and the electrode in honeycomb structure body according to a second exemplary embodiment of the present invention.

FIG. 8 is a plan view showing the structure of the slit section, the electrode terminal and the electrode in the honeycomb structure body 1 according to the second exemplary embodiment of the present invention. FIG. 9 is a view showing the structure of the slit section, the electrode terminal and the electrode in the honeycomb structure body 1 along the line IX shown in FIG. 3.

Figure 9:
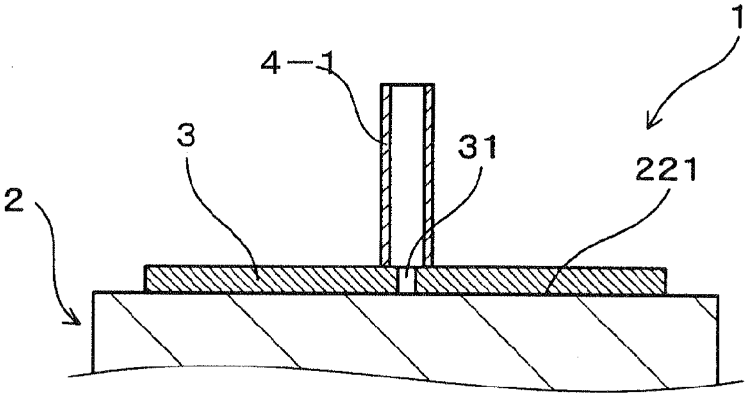
FIG. 9 is a view showing the slit section, the electrode terminal and the electrode in the honeycomb structure body along the line IX shown in FIG. 3.

As shown in FIG. 8 and FIG. 9, the second exemplary embodiment discloses the honeycomb structure body 1 having an electrode terminal 4-1 which is a modification of the electrode terminal 4 shown in FIG. 1 used in the first exemplary embodiment.

As shown in FIG. 8 and FIG. 9, the electrode terminal 4-1 has a cylindrical hollow shape. Specifically, a through hole is formed in the electrode terminal 4-1. The electrode terminal 4-1 is formed on the slit section 31. The slit section 31 divides the electrode 3 into the electrode sub-sections 3*a* and 3*b*.

The components excepting the electrode terminal 4-1 in the honeycomb structure body 1 according to the second exemplary embodiment are the same as the components in the honeycomb structure body 1 according to the first exemplary embodiment. Therefore the honeycomb structure body 1 according to the second exemplary embodiment has the same action and effects of the honeycomb structure body 1 according to the first exemplary embodiment. The explanation of the action and effects of the honeycomb structure body 1 according to the second exemplary embodiment is therefore omitted here.

Third Exemplary Embodiment

A description will be given of the honeycomb structure body according to a third exemplary embodiment of the present invention with reference to FIG. 10 to FIG. 13.

Figure 10:
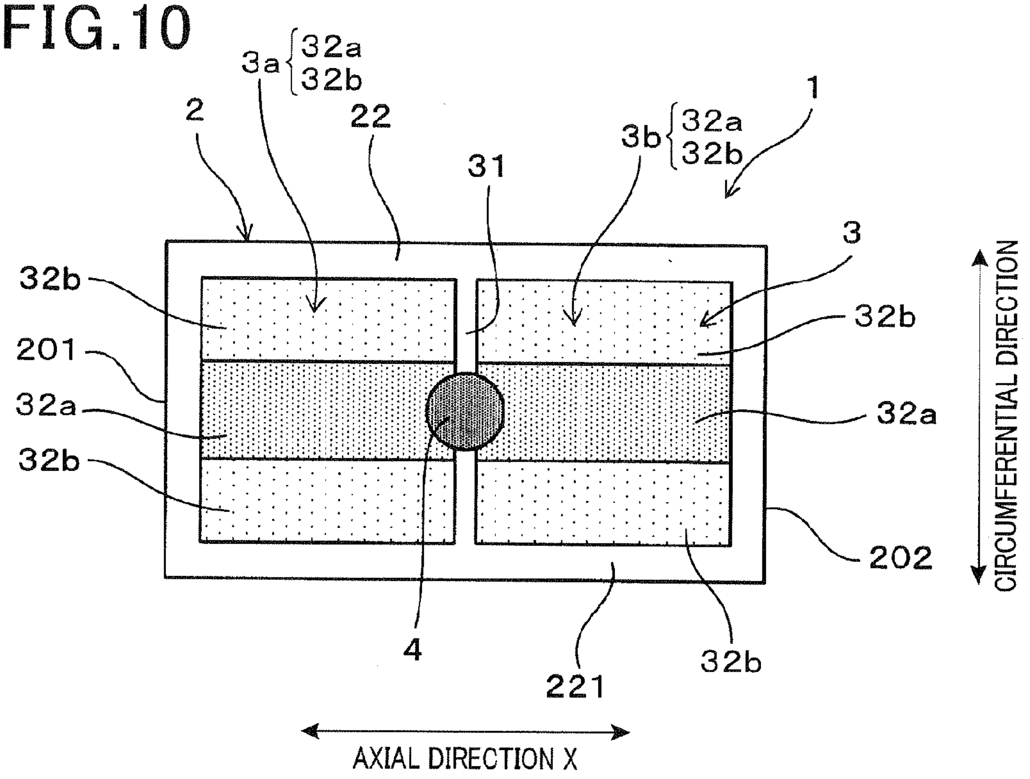
FIG. 10 is a plan view showing a structure of the slit section, the electrode terminal and the electrode in the honeycomb structure body according to a third exemplary embodiment of the present invention.

FIG. 10 is a plan view showing the structure of the slit section, the electrode terminal and the electrode in the honeycomb structure body 1 according to the third exemplary embodiment of the present invention. As shown in FIG. 10, the third exemplary embodiment shows a modification of the electrode 3. Specifically, the electrode 3 is comprised of a plurality of electrode sub-sections 3*a* and 3*b* arranged in a circumferential direction of the honeycomb body 2. In more detail, each of the electrode sub-sections 3*a* and 3*b* is comprised of a reference electrode section 32*a* and outside electrode sections 32*b*. The reference electrode section 32*a* is arranged at a central part in a circumferential direction of the honeycomb body 2 and the outside electrode sections 32*b* are arranged at both sides of the reference electrode section 32*a* in a circumferential direction of the honeycomb body 2. The electrode terminal 4 is formed on the reference electrode section 32*a*.

The electrode 3 in the honeycomb structure body 1 according to the third exemplary embodiment satisfies a relationship of S1>S2, where S1 indicates a strength of the electrode sub-section 3*a* (as the reference electrode section 32*a*), and S2 indicates a strength of the outside electrode sections 32*b* excepting the reference electrode section 32*a*. The above strength of the electrode section is detected by a four-point bending test which is usually used as a ceramic strength test because electrodes are in general formed by ceramics.

The other components of the honeycomb structure body 1 according to the third exemplary embodiment are the same as the components of the honeycomb structure body 1 according to the first exemplary embodiment. Accordingly, the same components are designated by the same reference numbers and characters, and the explanation thereof is omitted.

In the honeycomb structure body 1 according to the third exemplary embodiment, the reference electrode section 32*a* on which the electrode terminal 4 is formed has a strength greater than a strength of the outside electrode sections 32*b* in order to increase durability against thermal stress. Other action and effects of the honeycomb structure body 1 according to the third exemplary embodiment are the same of those in the honeycomb structure body 1 according to the first exemplary embodiment.

Figure 11:
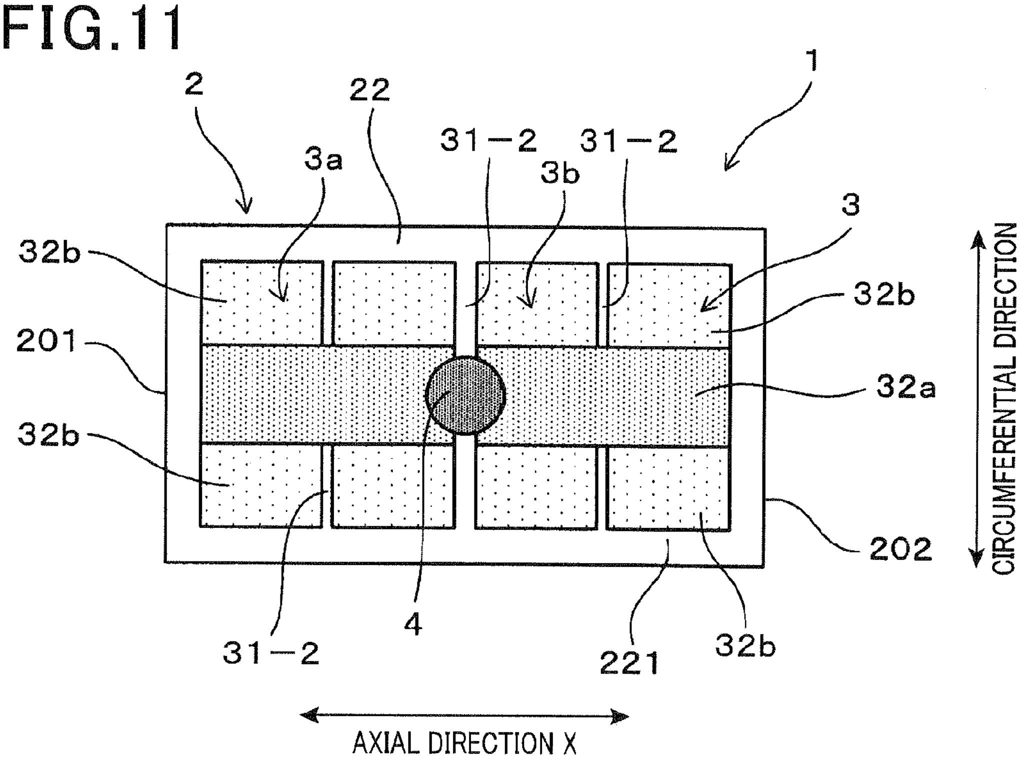
FIG. 11 is a plan view showing another structure of the slit section in the honeycomb structure body according to the third exemplary embodiment of the present invention shown in FIG. 10.

FIG. 11 is a plan view showing another structure of the slit section, the electrode terminal and the electrode in the honeycomb structure body according to the third exemplary embodiment of the present invention shown in FIG. 10. As shown in FIG. 10, the slit section 31 is formed in the electrode terminal formation section, on which the electrode terminal 4 is formed, and in the outside section of the electrode terminal formation section along a circumferential direction of the honeycomb body 2. However, the concept of the present invention is not limited by this structure. For example, as shown in FIG. 11, it is possible for the slit section 31 in the honeycomb structure body 1 according to the third exemplary embodiment to have another structure in which a plurality of slit sections 31-2 formed in the outside electrode sections 32*b* in addition to the slit section 31.

Figure 12:
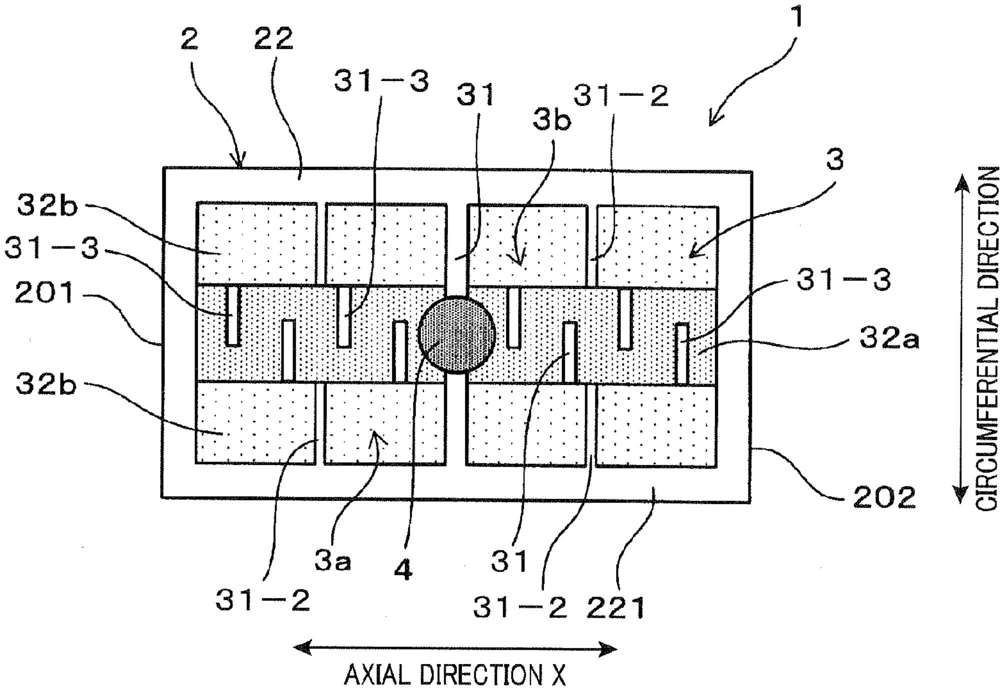
FIG. 12 is a plan view showing another structure of the slit section in the honeycomb structure body according to the third exemplary embodiment of the present invention shown in FIG. 10.

FIG. 12 is a plan view showing another structure of the slit so section, the electrode terminal and the electrode in the honeycomb structure body 1 according to the third exemplary embodiment of the present invention shown in FIG. 10.

Further, as shown in FIG. 12, it is possible for the slit section 31 in the honeycomb structure body 1 according to the third exemplary embodiment to have another structure in which a plurality of slit sections 31-3 are formed in the reference electrode section 32*a* in addition to the slit sections 31 and 31-2. In order for the current flows through the overall electrode 3, it is necessary that the overall electrode 3 is electrically connected to the electrode terminal 4. Accordingly, the slit sections 31-2 do not cross the reference electrode section 32*a* in a circumferential direction of the honeycomb body 2.

Figure 13:
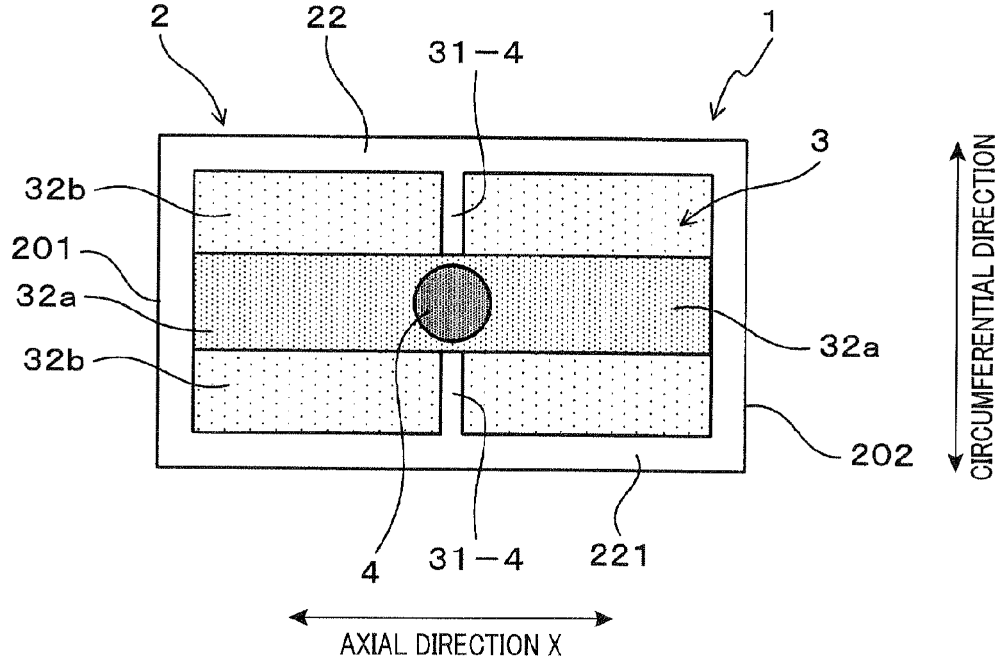
FIG. 13 is a plan view showing another structure of the slit section in the honeycomb structure body according to the third exemplary embodiment of the present invention shown in FIG. 10.

FIG. 13 is a plan view showing another structure of the slit section, the electrode terminal and the electrode in the honeycomb structure body according to the third exemplary embodiment of the present invention shown in FIG. 10. By the way, in the structure of the honeycomb structure body 1 according to the third exemplary embodiment shown in FIG. 10, the slit section 31 is formed in the electrode terminal formation section and the outside sections of the electrode terminal formation section in a circumferential direction. However, the concept of the present invention is not limited by this structure. For example, as shown in FIG. 13, it is possible for the slit section 31 in the honeycomb structure body 1 according to the third exemplary embodiment to have another structure in which slit sections 31-4 are formed in the outside sections of the electrode terminal formation section in a circumferential direction, and are not formed in the electrode terminal formation section.

Still further, as omitted from the drawings, it is possible for the slit section 31 in the honeycomb structure body 1 according to the third exemplary embodiment to have another structure in which slit section is formed in the electrode terminal formation section only.

Fourth Exemplary Embodiment

A description will be given of the honeycomb structure body according to a fourth exemplary embodiment of the present invention with reference to FIG. 14 to FIG. 16.

Figure 14:
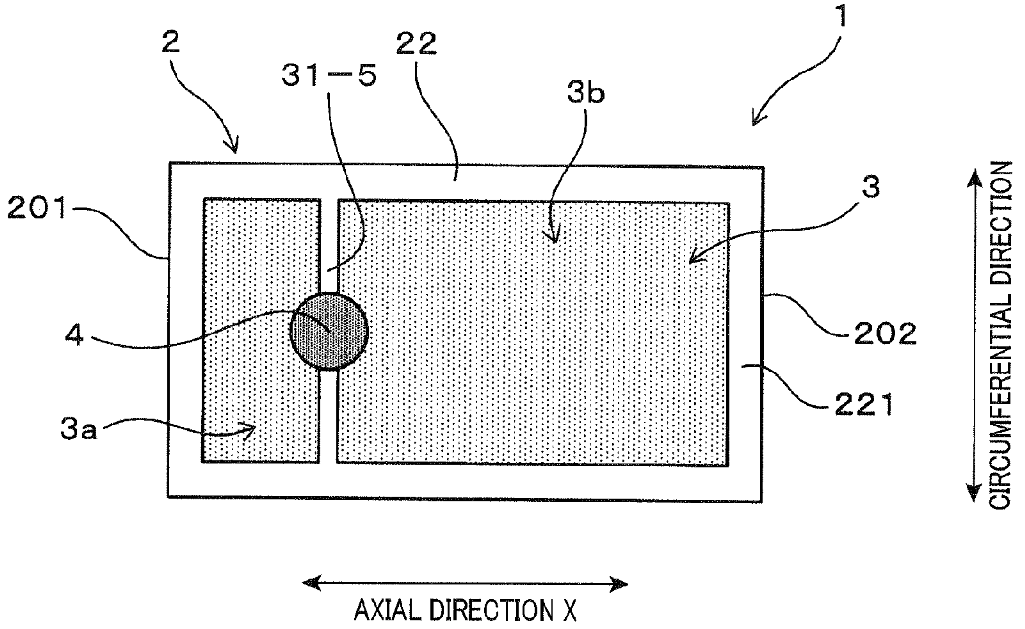
FIG. 14 is a plan view showing a structure of the slit section in the honeycomb structure body according to a fourth exemplary embodiment of the present invention.

FIG. 14 is a plan view showing the structure of the slit section, the electrode terminal and the electrode in the honeycomb structure body 1 according to the fourth exemplary embodiment of the present invention. The fourth exemplary embodiment discloses a modification of the slit section formation section.

As shown in FIG. 14, the slit section 31-5 is formed in a section which is near to the end surface 201 side of the honeycomb body 2 from the central section of the electrode 3. Exhaust gas is introduced from the end surface 201 of the honeycomb body 2 into the inside of the honeycomb body 2. Specifically, as shown in FIG. 14, the slit section 31-5 is formed at an inside section by 30 mm measured from the end surface 201. The electrode terminal 4 is formed in the electrode and in the section through which the slit section 31-5 is formed. Other components, action and effects of the honeycomb structure body 1 according to the fourth exemplary embodiment are the same of those in the honeycomb structure body 1 according to the first exemplary embodiment. Accordingly, the same components are designated by the same reference numbers and characters, and the explanation thereof is omitted.

Figure 15:
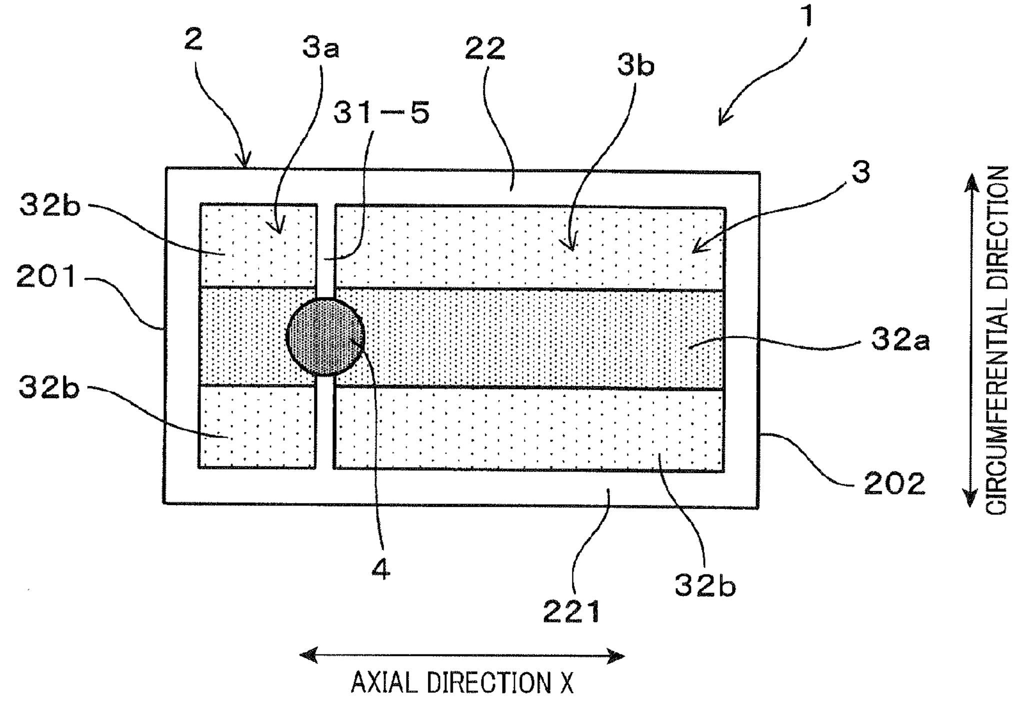
FIG. 15 is a plan view showing another structure of the slit section in the honeycomb structure body according to the fourth exemplary embodiment of the present invention shown in FIG. 14.

FIG. 15 is a plan view showing another structure of the slit section, the electrode terminal and the electrode in the honeycomb structure body according to the fourth exemplary embodiment of the present invention shown in FIG. 14. However, the concept of the present invention is not limited by this structure. For example, as shown in FIG. 15, it is possible for the honeycomb structure body 1 according to the fourth exemplary embodiment to have another structure in which the electrode 3 is comprised of a plurality of electrode sub-sections such as the reference electrode section 32*a* and the outside electrode sections 32*b*, similar to the structure of the electrode in the honeycomb structure body 1 according to the third embodiment shown in FIG. 10.

Next, a description will now be given of the determination of the slit section formation section and the electrode terminal formation section with reference to FIG. 16. FIG. 16 is a plan view showing a structure of the electrode 3 in the honeycomb structure body 1 without any slit section according to the fourth exemplary embodiment of the present invention. FIG. 17 is a view showing a cross section of various positions to which thermocouples are connected to the honeycomb structure body according to the fourth exemplary embodiment of the present invention.

Figure 16:
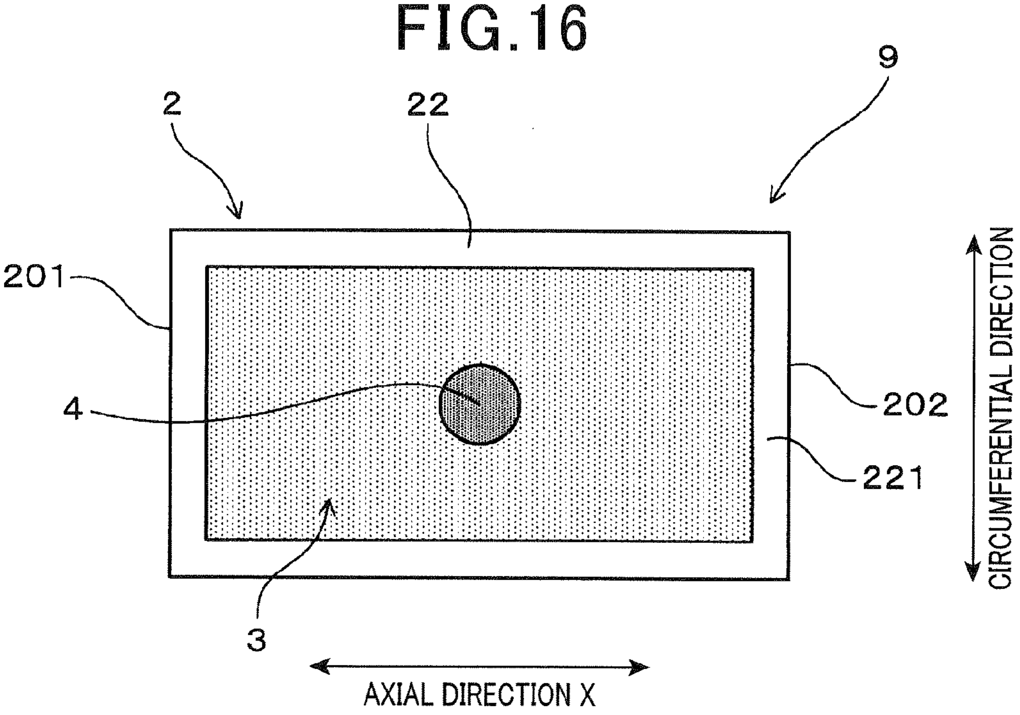
FIG. 16 is a plan view showing a structure of the electrode in the honeycomb structure body without any slit section according to the fourth exemplary embodiment of the present invention.
Figure 17:
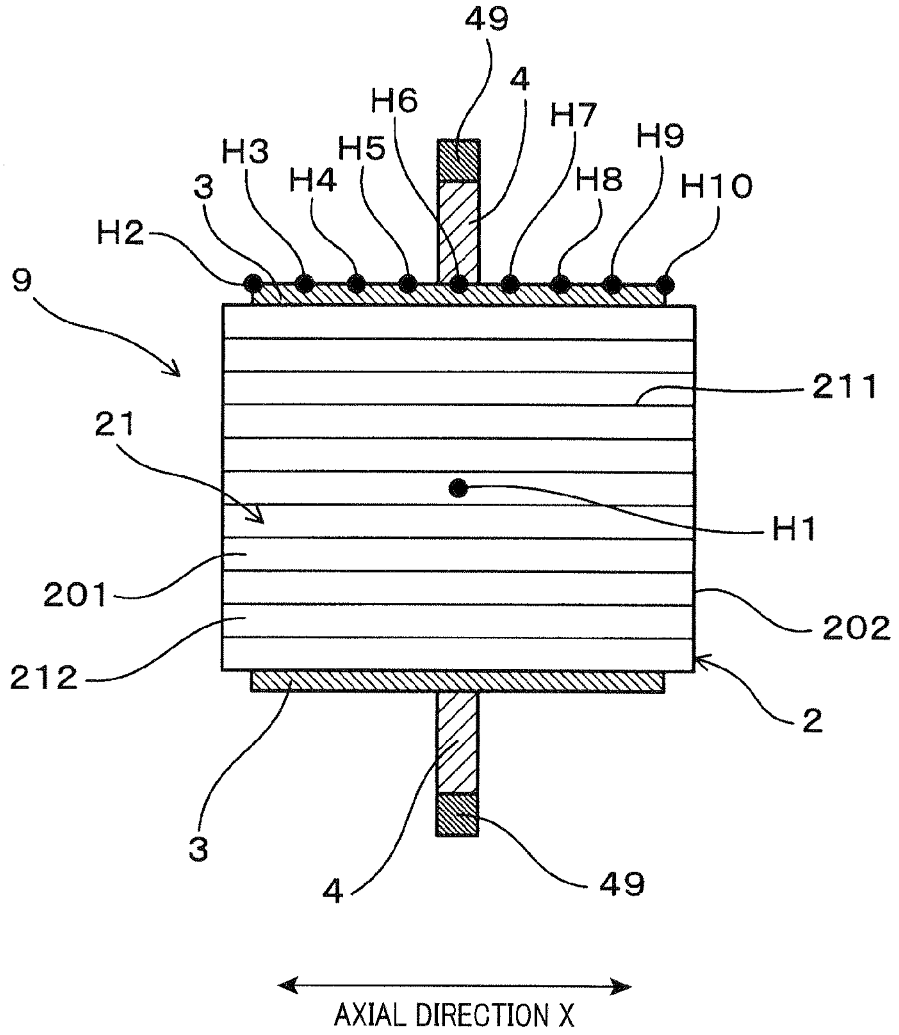
FIG. 17 is a view showing a cross section of various positions to which thermocouples are connected to the honeycomb structure body according to the fourth exemplary embodiment of the present invention.

FIG. 16 shows the structure of the honeycomb structure body 9. As shown in FIG. 17, a thermocouple is attached on the central section H1 of the honeycomb structure body 9. Nine thermocouples are attached at thermocouple arrangement sections H2, H3, H4, H5, H6, H7, H8, H9 and H10 on the surface of the honeycomb body 2 at regular intervals of 10 mm from an axial one end surface of the electrode 3.

Next, the honeycomb structure body 9 with the thermocouples is placed in an engine bench test using an internal combustion engine of 4.3 liter displacement. A temperature of each of the thermocouple arrangement sections H1 to H10 is detected in a predetermined test step. The engine bench test is executed to have a condition in which the thermocouple arrangement section H1 has a maximum temperature of approximately 900° C.

In the fourth exemplary embodiment, an engine rotation speed is increased to 3800 rpm from 500 rpm (in an engine idling state) within approximately five seconds after the engine start. The engine rotation sped of 3800 rpm is maintained for ten minutes. After this, the engine rotation speed of 3800 rpm is decreased to 1500 rpm within approximately ten seconds, and the engine rotation speed of 1500 rpm is maintained for two minutes. After this, the engine rotation speed is decreased from 1500 rpm to 500 rpm (in the engine idling state). During the above engine bench test, a temperature of each of the thermocouple arrangement sections H1 to H10 in the honeycomb structure body 9 is detected.

Figure 18:
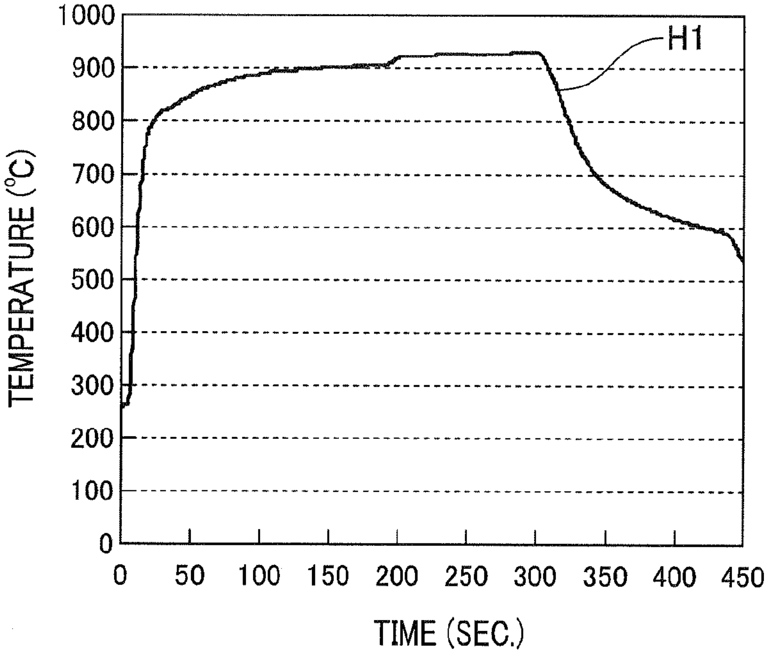
FIG. 18 is a view showing a graph indicating a relationship between a time period counted from the start of an engine bench test and a temperature at a thermocouple arrangement section H1 on the honeycomb structure body according to the fourth exemplary embodiment of the present invention.
Figure 19:
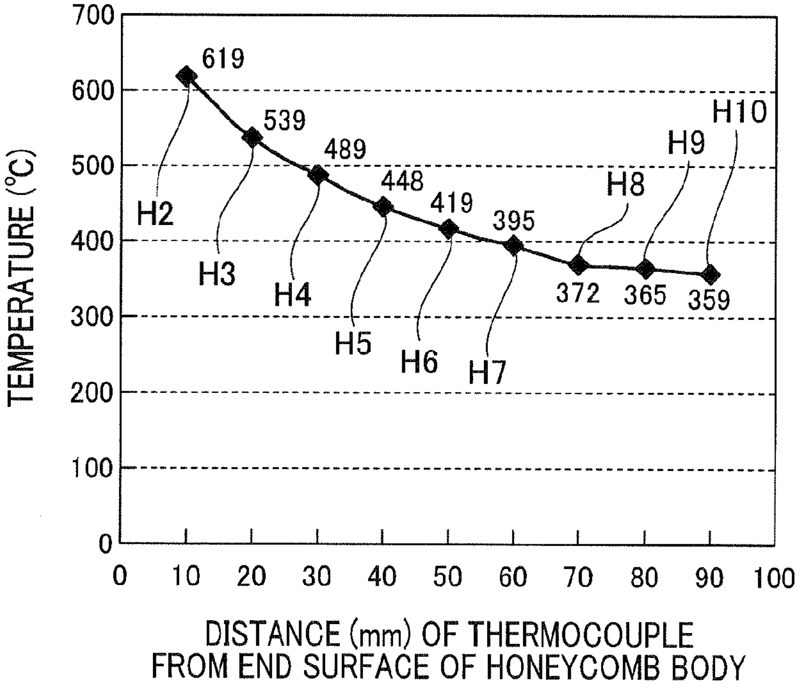
FIG. 19 is a view showing a graph indicating a relationship between thermocouple arrangement sections H1 to H10 and a temperature of the honeycomb structure body according to the fourth exemplary embodiment of the present invention.

FIG. 18 is a view showing a graph indicating a relationship between a time period counted from the start of the engine bench test and a temperature at the thermocouple arrangement section H1 on the honeycomb structure body according to the fourth exemplary embodiment of the present invention. FIG. 19 is a view showing a graph indicating a relationship between thermocouple arrangement sections H1 to H10 and a temperature of the honeycomb structure body 9 according to the fourth exemplary embodiment of the present invention.

The temperature (° C.) of the thermocouple arrangement sections H1 to H10 is detected after 17 seconds counted from the engine start as the start of the engine bench test, at which a temperature difference between one end and the other end in an axial direction of the honeycomb structure body 9 becomes large.

Next, on the basis of the graph shown in FIG. 19, it is detected that a temperature difference between one end and the other end of each of the divided electrode sub-sections divided at each of the thermocouple positions H2 to H10, and the maximum temperature difference in the detected temperature differences becomes a minimum temperature difference by selecting one of the thermocouple positions H2 to H10. As shown in FIG. 19, for example, a temperature difference between the thermocouple arrangement section H2 (619° C.) and the thermocouple arrangement section H4 (489° C.) is 130° C. The thermocouple arrangement section H4 is 30 mm inside measured from the end surface 201 of the honeycomb structure body 9. Further, a temperature difference between the thermocouple arrangement section H4 (489° C.) and the thermocouple arrangement section H10 (359° C.) is 130° C. Accordingly, when the slit section is formed in the thermocouple arrangement section H4 at which the electrode is divided into two electrode sub-sections, a maximum temperature difference between both ends in an axial direction of the electrode sub-section is 130° C.

On the basis of the detection results shown in FIG. 19, the slit section 31-5 is formed in the section of 30 mm inside from the end surface 201 of the honeycomb body 2, where exhaust gas is introduced into the inside of the honeycomb body 2 through the end surface 201 of the honeycomb body 2.

Next, a description will now be given of the action and effects of the honeycomb structure body according to the fourth exemplary embodiment of the present invention.

In the honeycomb body 2 of the honeycomb structure body, the slit section 31 is formed at the slit section formation section so that a temperature difference between one end and the other end in axial direction of the divided electrode sub section 3*a*, 3*b* has a minimum value. This makes it possible to decrease thermal stress generated in the electrode sub-sections 3*a* and 3*b*, and to suppress cracks from being generated in the electrode sub-sections 3*a* and 3*b*.

The other components of the honeycomb structure body 1 according to the fourth exemplary embodiment are the same as the components of the honeycomb structure body 1 according to the first exemplary embodiment. Accordingly, the explanation of the same components is omitted.

Fifth Exemplary Embodiment

A description will be given of the evaluation results according to a fifth exemplary embodiment of the present invention.

Table 1 shows detection results of various parameters of test samples E1 to E4 and comparative samples C1 to C4. The test samples E1 to E4 have a slit section formed in the electrode. On the other hand, no slit section is formed in the electrode of the comparative samples C1 to C4. The test samples E1 to E4 and the comparative samples C1 to C4 have basically the same components of the honeycomb structure body 1 according to the first exemplary embodiment excepting the presence of the slit section.

That is, each of the test samples E1 to E4 and the comparative samples C1 to C4 has a diameter of 93 mm, an axial length of 100 mm, a thickness of a porous partition wall of 0.15 mm, and a cell density of 0.62 pieces/$mm^2$.

The test sample E1 has the electrode having the shape shown in FIG. 2. The test sample E2 has the electrode having the shape shown in FIG. 10. The test sample E3 has the electrode having the shape shown in FIG. 14. The test sample E4 has the electrode having the shape shown in FIG. 15. The comparative samples C1, C2, C3 and C4 have the electrode having the shape shown in FIG. 16.

Table 1 shows an axial length of each of the test samples E1 to E4 and the comparative samples C1 to C4. In each of the test samples E1 to E4 and the comparative samples C1 to C4, the electrode is formed so that the axially central position of the electrode is equal to the axially central position of the honeycomb body. A distance of the electrode terminal in Table 1 indicates a distance of the electrode terminal measured from the end surface of the honeycomb body through which exhaust gas is introduced into the inside of the honeycomb body. The slit section is formed in each of the test samples E1 to E4.

The electrodes of each of the test samples E1 and E3, the reference electrode section in the electrode of the test samples E2 and E4, and the electrode of the comparative samples C1 to C4 are made of electrode material D1. That is, the electrode material D1 is produced by using a green body which is produced by extrusion molding using a mixture of SiC, Si, and C. The green body is dried and fired to produce the electrode material D1. The electrode material D1 is adhered on the honeycomb body as the above samples E1 to E4 and C1 to C4 by using adhesive agent made of paste material, which is the same material of electrode material D2 which will be explained.

The outside electrode section of the test samples E2 and E4 is made of the electrode material D2. The electrode material D2 is made of a mixture paste of SiC, FeSiAl alloy, water, methyl cellulose as viscosity control binder, and silica sol as strength reinforcement material. The mixture paste as the electrode material D2 is formed on the test sample and dried and fired to produce the electrode.

The electrode and the reference electrode section made of the electrode material D1 has a bending strength a of 60 MPa, a thermal expansion coefficient $\alpha$ of $4.4\times10^{-6}$/° C., a Young's modulus E of 100 GPA, and a thermal shock fracture resistance parameter R of 136° C. The outside electrode section made of the electrode material D2 in the test samples E2 and E4 has a bending strength a of 15 MPa, a thermal expansion coefficient $\alpha$ of $6.3\times10^{-6}$/° C., a Young's modulus E of 11.5 GPA, and a thermal shock fracture resistance parameter R of 207° C.

The electrode terminal material forming the electrode terminal is produced so that composite material of SiC—Si is extruded and molded, and the obtained mold body is dried and fired. The electrode terminal material is adhered on the electrode by using adhesive agent made of paste material which is the same material of the electrode material D2, previously described.

A description will now be given of the evaluation of a crack resistance function of each of the test samples E1 to E4 and the comparative samples C1 to C4.

The engine bench test using an internal combustion engine of 4.3 liter displacement is executed for the honeycomb structure body as each of the test samples E1 to E4 and the comparative samples C1 to C4, in which thermocouples are attached on the same positions of the honeycomb structure body according to the fourth exemplary embodiment shown in FIG. 17. The engine test bench in the fourth exemplary embodiment is executed 50 times, namely, 50 cycles for each of the test samples E1 to E4 and the comparative samples C1 to C4. After the engine bench test of 50 cycles, it is detected whether or not cracks were generated in each sample by using a microscope.

In the engine bench test, a maximum temperature difference (Max$\Delta$T) between the both ends of the electrode subsection of each of the test samples is detected on the basis of a temperature of each of the thermocouple positions H1 to H10 shown in FIG. 17 detected after the engine start. By the way, a maximum temperature difference Max Max$\Delta$T between both axial ends of the electrode of each of the comparative samples C1 to C4 is detected.

TABLE 1

| R (° C.): Thermal shock fracture resistance parameter | | | | | | | | | | |
|---|---|---|---|---|---|---|---|---|---|---|
| | | | Electrode | | | | | | Cracks | |
| | | | (Reference electrode section) | | Outside electrode section | | | | | |
| Samples | Electrode length (mm) | Electrode terminal position (mm) | Material | R(° C.) | Material | R(° C.) | Slit section | MaxΔT (° C.) | Electrode (Reference electrode section) | Outside electrode section |
| E1 | 50 | 50 | D1 | 136 | — | — | presence | 92 | none | — |
| E2 | 50 | 50 | D1 | 136 | D2 | 207 | presence | 92 | none | none |
| E3 | 80 | 30 | D1 | 136 | — | — | presence | 130 | none | — |
| E4 | 80 | 30 | D1 | 136 | D2 | 207 | presence | 130 | none | none |
| C1 | 50 | 50 | D1 | 136 | — | — | none | 142 | presence | — |
| C2 | 60 | 50 | D1 | 136 | — | — | none | 174 | presence | — |
| C3 | 70 | 50 | D1 | 136 | — | — | none | 217 | presence | — |
| C4 | 80 | 50 | D1 | 136 | — | — | none | 260 | presence | — |

Further, Table 1 shows the evaluation results of crack resistance function of each of the test samples E1 to E4 and the comparative samples C1 to C4.

As can be clearly understood from the evaluation results shown in Table 1, because none of the comparative samples C1 to C4 have any slit section, the maximum temperature difference MaxΔT becomes higher than the thermal shock fracture resistance parameter R in each of the comparative samples C1 to C4, and cracks are generated in each of the comparative samples C1 to C4.

On the other hand, because each of the test samples E1 to E4 has the slit section, no cracks are generated because the maximum temperature difference MaxΔT becomes lower than the thermal shock fracture resistance parameter R (° C.) in each of the test samples E1 to E4.

In each of the test samples E3 and E4, although the axial length of the electrode is 80 mm, like the comparative sample C4, the test samples E3 and E4 have the structure in which the slit sections divides the electrode into the electrode sub-sections, and the slit section formation position is determined so that the maximum temperature difference MaxΔT of the electrode becomes a minimum value. Accordingly, as compared with the comparative sample C4, each of the test samples E3 and E4 has approximately a half of the maximum temperature difference MaxΔT of the comparative sample C4 as shown in Table 1. This makes it possible to suppress cracks from being generated in each of the test samples E3 and E4.

As previously described in detail, it is possible to suppress cracks from being generated in the electrode of the honeycomb structure body by the presence of the slit section formed in the electrode. In addition to this effect, it is possible to further suppress cracks from being generated in the electrode and the peripheral section of the electrodes because the formation of the slit section makes it possible to decrease the maximum temperature difference MaxΔT in the electrode and its peripheral section.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A honeycomb structure body comprising:

a honeycomb body comprising a cell formation section and an outer skin section having a cylindrical shape and covering the cell formation section;

a pair of electrodes formed on an outer peripheral surface of the outer skin section so that the electrodes faced with to each other in a radial direction of the honeycomb body;

a pair of electrode terminals, each of the electrode terminals being formed in an electrode terminal formation section on the corresponding electrode; and one or more slit sections formed in at least one of the electrode terminal formation section and a circumferential outside section of the electrode terminal formation section, wherein the slit section is formed directly under the electrode terminal in the electrode terminal formation section.

2. The honeycomb structure body according to claim 1, wherein the slit section is formed in the electrode along a circumferential direction of the honeycomb body.

3. The honeycomb structure body according to claim 2, wherein the slit section is formed so that the slit section crosses the corresponding electrode in a circumferential direction of the honeycomb body.

4. The honeycomb structure body according to claim 3, wherein the slit section is formed to cross the corresponding electrode in a circumferential direction of the honeycomb body so that the slit section divides the corresponding electrode into two electrode sub-sections, and the electrode has an axial length of not less than 50 mm, a bending strength σ within a range of 5 to 130 MPa, a thermal expansion coefficient a within a range of 4 to 6.5x10-6/° C., a Young's modulus E within a range of 10 to 300 GPA, and a thermal shock fracture resistance parameter R of not less than 130° C., where the thermal shock fracture resistance parameter R is expressed by a formula:

$$R=\sigma/(\alpha X E).$$

5. The honeycomb structure body according to claim 1, wherein the electrode is comprised of a plurality of electrode sub-sections arranged in a circumferential direction of the honeycomb structure body, and to have a relationship of S1>S2, where S1 indicates a strength of the electrode sub-section on which the electrode terminal is formed, and S2 indicates a strength of the electrode sub-section on which no electrode terminal is formed.

6. The honeycomb structure body according to claim 1, wherein the honeycomb structure body is accommodated in a casing, and the casing is comprised of a cylindrical covering section and a terminal covering section, the electrode terminals are covered with the terminal covering section and projects from the cylindrical covering section to outside, a supporting member is arranged between the cylindrical covering section, the electrodes and the honeycomb body, and the electrode terminals are covered with the supporting member at the inside of the cylindrical covering section.

7. The honeycomb structure body according to claim 6, wherein the electrode terminal is made of ceramics, and a metal terminal is connected to the electrode terminal, and a junction between the electrode terminal and the metal terminal is arranged at an outside of the cylindrical covering section, and an axial length of the terminal covering section is not less a half of an axial length of the electrode.

8. The honeycomb structure body according to claim 1, wherein the honeycomb structure body is used in an electric heating catalyst (EHC) device capable of heating catalyst supported by the honeycomb body when electric power is supplied to the electrodes.

9. The honeycomb structure body according to claim 1, wherein the slit section is a groove formed in a surface of the electrode along a circumferential direction of the honeycomb body.

* * * * *